Figure 1:
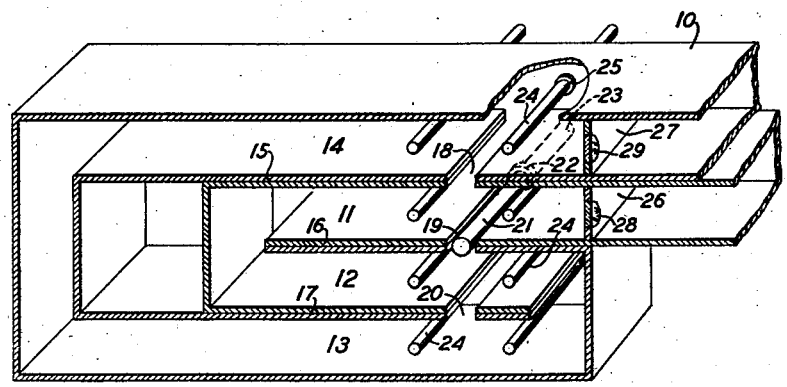

Dec. 28, 1948.  A. E. BOWEN  2,457,524
WAVE GUIDE REPEATER
Filed May 26, 1945

INVENTOR
A. E. BOWEN
BY
Franklin Mohr
ATTORNEY

Patented Dec. 28, 1948

2,457,524

UNITED STATES PATENT OFFICE 2,457,524

WAVE GUIDE REPEATER

Arnold E. Bowen, Red Bank, N. J., assignor to Bell Telephone Laboratories, Incorporated, New York, N. Y., a corporation of New York Application May 26, 1945, Serial No. 595,911

7 Claims. (Cl. 315—5)

This invention relates to amplifiers, oscillators, repeaters and the like and more particularly to a microwave repeater incorporated in a wave guide of the hollow pipe type.

The arrangement of the invention is particularly adapted to reenforcing, amplifying or repeating a microwave in a continuous length of hollow pipe wave guide, the wave to be amplified serving at one or more points along the axis of the wave guide to control the action of a group or cloud of electrically charged moving particles, such as electrons. The action of the wave to be amplified upon the particles is preferably to sort the particles into groups, one group comprising particles vibrating in such phase as to transfer a net increment of energy from their energy of kinetic motion to the energy of the electromagnetic wave, thereby intensifying or amplifying the wave. Adjacent to the region in which the sorting of particles occurs, there is provided a passageway for particles to be transferred to another portion of the wave guide. A second group of particles resulting from the sorting comprises particles operating in such phase as to absorb energy from the electromagnetic wave, thereby increasing their velocities. The particles which have their velocity thus increased are preferably directed through the said passageway to the other portion of the wave guide. In this section of the wave guide, provision is made to make the particles oscillate substantially in a group by means of locally applied energy not derived from the wave to be amplified. The phase of the wave in this second section of the wave guide is preferably such that the oscillating group of particles will transfer kinetic energy to the electromagnetic wave. Provision is made, in known manner, for a continual supply of fresh particles in the first section of the wave guide and for the removal of spent particles from either section.

In accordance with the invention, a continuous length of hollow pipe wave guide is arranged to have at least two portions which are laterally contiguous, being separated at one point by a common wall. The laterally contiguous portions are connected not only axially along the interior of the wave guide but laterally as through an aperture in the common wall. A source of charged particles such as a cathode is arranged directly across from the aperture in a portion of the wall of the wave guide opposite the aperture and means are provided in each of the laterally contiguous portions of the wave guide to accelerate electrons from a plurality of directions towards an equilibrium region preferably located substantially mid-way between a pair of opposite wall portions of the wave guide. The accelerating means is preferably adjusted to produce oscillations having substantially the same frequency as the electromagnetic wave to be amplified. The particles supplied by the cathode are set into oscillation by the accelerating means in the portion of the wave guide including the cathode. In this portion of the wave guide, the particles, which may be oscillating in all possible phases at random, are sorted by means of the electromagnetic wave into two groups as above described, one group returning oscillatory energy to the wave in the same portion of the wave guide, the other group being accelerated through the aperture into the laterally contiguous portion of the wave guide. This latter group is set into oscillation by the accelerating means in the second portion of the wave guide and delivers a substantial portion of this energy to the electromagnetic wave in that section.

In a preferred embodiment of the invention, the wave guide has four laterally contiguous portions separated by three and only three common walls in the region of continuity. The inner two laterally contiguous portions are consecutively connected along the length of the wave guide and the outer two portions are similarly consecutively connected. The cathode is located effectively in the middle one of the three common walls and has active surfaces exposed toward the inner two laterally contiguous portions. Oscillating clouds of charged particles are formed on either side of the cathode and accelerating means are provided in all four of the laterally contiguous portions. In this embodiment the electromagnetic wave may perform the sorting function in two of the laterally contiguous portions and may absorb energy from the oscillating particles in at least two places.

Figure 2:
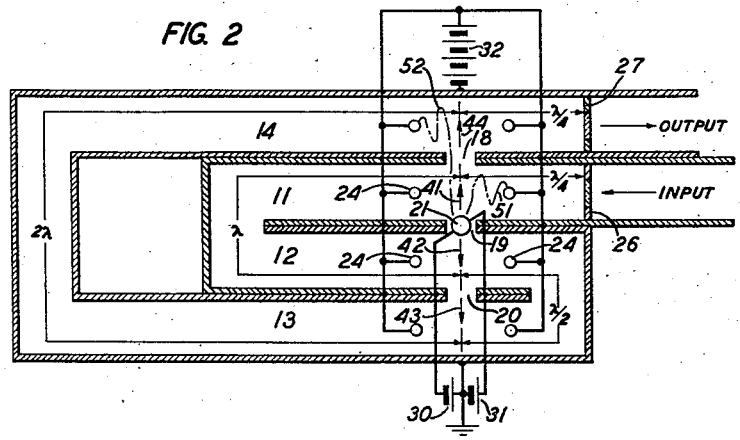

In the drawing, Fig. 1 is a perspective view, partly in sections, of a preferred embodiment of the invention and Fig. 2 is a wiring scheme and diagrammatic representation useful in describing the operation of the arrangement shown in Fig. 1.

Referring to Fig. 1, a continuous length of wave guide 10 of the hollow pipe type is shown arranged in a bent or folded configuration producing four laterally contiguous portions 11, 12, 13 and 14, respectively, which are consecutively connected along the length of the wave guide in the order named. The laterally contiguous portions are preferably arranged with their longitudinal axes parallel to each other, at least in the region of contiguity. In this arrangement, there are three common walls 15, 16 and 17, respectively, separating the pairs of immediately adjacent contiguous portions.

For simplicity, it will be assumed that the wave guide is used to transmit the $H_{11}$ type of wave, the guide being of rectangular cross-section and of suitable dimensions to support a wave of the desired frequency. This being the case, the electric vector, in the horizontal portions of the wave guide 10 will lie in the vertical direction.

The common walls 15, 16 and 17 are preferably provided with transverse slots 18, 19 and 20, respectively, and these are preferably aligned in a vertical plane as illustrated. In the middle slot 19 is preferably mounted a thermionic cathode 21 which may be in the form of a rod coated with a suitably emissive substance and introduced through the side wall of the wave guide 10 through an insulating bushing 22 at either end. A heating current may be set up in the rod 21 through projecting end portions such as 23 at either end of the rod. The cathode 21 preferably presents a thermionically active surface toward each of the wave guide portions 11 and 12. A plurality of anode rods 24 may be provided and there may be, for example, two of the rods in each portion of the wave guide as shown in Fig. 1, symmetrically arranged in pairs with respect to the plane of the slots 18, 19 and 20. The rods 24 preferably are mounted mid-way between the top and bottom walls of the wave guide, as viewed in the drawing and parallel in direction with the cathode 21. Each rod 24 may be inserted through an insulating bushing 25 in the side wall of the wave guide. The rods preferably are kept out of direct line with the slots 18, 19 and 20.

Diaphragms 26 and 27 are preferably provided as shown, to define a resonator therebetween wherein a standing wave pattern of the desired frequency may be established. Apertures or windows 28 and 29 may be provided in the respective diaphragms 26 and 27 for input and output coupling between the resonator and the remainder of the continuous length of wave guide 10. The apertures may be sealed with a suitable dielectric material such as glass.

The view in Fig. 1 comprises a longitudinal section of the wave guide 10 with the front half cut away. The walls of the wave guide 10 are preferably highly conductive, at least over their inner surfaces. The interior space of the resonator, at least in the region including the cathode, the slots 18, 19 and 20, and the anode blocks 24 is preferably evacuated. To maintain a seal for the vacuum chamber the walls of the wave guide 10 should be vacuum tight, including the bushings 22 and 25 and the coupling apertures or windows 28 and 29.

Fig. 2 shows suitable electrical connections to the cathode and anode, the conductive mass of the wave guide 10 being preferably connected to ground. Heating current may be supplied to the cathode 21 by means of balanced batteries 30 and 31. Anode potential may be applied to the rods 24 as by means of a battery 32.

To develop maximum alternating potentials in the wave guide at the operating frequency, the slots 18, 19 and 20 are preferably spaced from each other and from the diaphragms 26 and 27 by appropriate multiples of a quarter wavelength. The spacing between the slots 18, 19 and 20 is also preferably related to the wavelength in such manner as to develop the desired polarity in the electric field in the neighborhood of each slot. In the embodiment illustrated, the axial separations along the wave guide beginning at the diaphragm 26 are, noted by legends in Fig. 2, a quarter wavelength from the diaphragm 26 to the slot 19, one whole wavelength from the slot 19 in the wave guide portion 11 to the opposite side of the slot 19 in the portion 12, a half wavelength between the slots 19 and 20, two wavelengths from the slot 20 to the slot 18 and a quarter wavelength from the slot 18 to the diaphragm 27. It will be understood that on account of the folding of the wave guide and other possible disturbing factors, the measurement given may not in every case correspond exactly to the linear measurement of the wave guide along the median plane of the guide, but the exact spacing may best be determined by experiment.

In the operation of the embodiment illustrated in the drawing, a wave to be amplified and having the frequency of the resonator, is introduced through the dielectric window 28 in the diaphragm 26 into section 11 of the resonator. The wave builds up a standing wave pattern in the resonator with polarities at the slots 18, 19 and 20 determined by the spacings above described. The polarities at a given instant are indicated by arrows 41, 42, 43 and 44 in Fig. 2. At the given instant the arrows 41 and 42 are directed away from the cathode 21 as are also the arrows 43 and 44. Half a cycle earlier or later, all the arrows 41, 42, 43 and 44 would have to be shown with their directions reversed, all pointing towards the cathode 21.

Electrons emerging from the cathode 21 are caused to oscillate about the median plane of the wave guide due to the attraction of the anode rods 24. If it were not for the action of the standing wave, each electron would execute several oscillations while being gradually drawn toward one of the anode rods 24 and would finally strike the anode and be returned to the cathode. Electrons being continually emitted from the cathode 21 will tend to form a cloud of electrons oscillating in all possible phases. The effect of the standing wave upon the oscillating electrons is to sort the electrons according to their phase. Electrons which are in such phase as to contribute a net increment of energy to the standing wave will be decelerated thereby and will eventually be collected by the anodes 24 in the section 11. Electrons which are in such phase as to absorb energy from the standing waves are accelerated and may be hurled through aperture 18 into the section 14. The polarity of the standing wave in section 14 is such as to absorb energy from those electrons which arrive from section 11. Such electrons are eventually collected by one of the anodes 24 in section 14. Illustrative trajectories for the two classes of electrons described are shown at 51 and 52, respectively. A corresponding sorting of the electrons emerging from the underside of the cathode as illustrated in the drawing, takes place in wave guide section 12 where one group of electrons delivers energy to the standing wave in section 12 and the other groups is hurled into section 13 and delivers energy to the standing wave there. The number of electrons driven through the apertures may be adjusted to be proportional to the intensity of the wave impressed upon the input, by appropriate selection of operating potentials.

While the energy exchange between the electrons and the standing wave in sections 11 and 12 on the one hand may be very nearly balanced so that there is no material net change in the energy of the standing wave in either section, on the other hand, due to the sorting action, the energy transfer in sections 13 and 14 is evidently quite unbalanced in favor of transfer of energy from the electrons to the wave. The net result is that the standing wave energy is enhanced at the expense of energy supplied to the electrons by the local source, in this case the battery 32. A portion of the standing wave energy is delivered through the aperture or window 29 in the diaphragm 27 to provide an output which may be utilized as desired.

It will be evident that the arrangement as described may be employed as an amplifier or repeater for waves introduced at the input and transmitted from the output of the system. If desired the input and output may be coupled together to provide either regenerative or degenerative amplification or to form a self-oscillatory system.

The polarity shown by the arrows 41 and 44, indicating that the electric intensity of the standing wave is in the same direction with respect to the cathode in sections 11 and 14, respectively, represents what is usually the proper relation of polarities at the two slots 18 and 19 to promote absorption of energy by the standing wave at the expense of the kinetic energy of the electrons. Those electrons which spend substantially a half cycle in traversing the wave guide section 11, meanwhile absorbing energy from the standing wave, arrive in section 14 just as the polarity of the standing wave is reversing and hence these electrons will traverse the section 14 in phase opposition to the standing wave so as to give up energy to the wave. Since many of the electrons will give up energy during part of a transit and absorb energy during the remainder or vice versa, the net result may be slightly different from what would be expected from consideration of only such electrons as are continually accelerated or continually decelerated. It may be advantageous, therefore, to vary the position of the diaphragms 26, 27, somewhat until a position is found which results in a maximum net transfer of energy as desired. For this purpose the diaphragms 26 and 27 may be made movable. Precaution should then be taken to preserve the vacuum in the operating space traversed by the electrons.

The addition or subtraction of a whole wavelength, where physically possible, in the spacing between two slots, or between a slot and one of the diaphragms will not in general have any first order effect upon the operation of the device.

It will be noted that, due to the folding or turning over of the wave guide between portions 12 and 13, an odd number of half wavelengths is needed between slots 19 and 20 to bring about the phase relation shown by the arrows 42 and 43. Similarly, an odd number of half wavelengths is needed between slots 18 and 19 to bring about the phase relation shown by the arrows 41 and 44. The use of both sides of the cathode 21 introduces the additional requirements of an integral number of wavelengths between the two sides of the cathode. If desired, the slot 19 may be omitted and separate cathodes may be supplied opposite the respective slots 18 and 20, in which case an odd number of half wavelengths will be needed between either slot 18 or 19 and its respective cathode and no limitation need be placed upon the spacing between the cathodes. Where separate cathodes are provided they are not limited to two in number.

The provision of resonance and the accompanying appearance of a standing wave pattern is not essential, and the diaphragms 26 and 27 may be omitted, in which case a traveling wave may be impressed at the input and the wave will appear at the output intensified. In this case the spacings between the cathode positions and the slots will need to be adjusted as before, and when so adjusted, the electric intensities in the wave guide portions connected by a given slot will have the correct phase relationship at all times.

What is claimed is:

1. A continuous length of hollow pipe wave guide having two laterally contiguous portions separated by a common wall having an aperture, a cathode directly across from said aperture in a portion of the wall of the wave guide opposite said common wall, and means in each of said laterally contiguous portions of the wave guide to impart reciprocating motion to charged particles from said cathode in the respective portion of the wave guide.

2. A continuous length of hollow pipe wave guide having two laterally contiguous portions separated by a common wall having an aperture, a cathode directly across from said aperture in a portion of the wall of the wave guide opposite said common wall, and non-alternating means in each of said laterally contiguous portions of the wave guide to accelerate electrons from a plurality of directions toward a region substantially midway between a pair of opposite walls in the respective portion of the wave guide.

3. A continuous length of hollow pipe wave guide having two laterally contiguous portions spaced an integral number of half wavelengths apart with respect to transmission of waves through the said wave guide at a preassigned operating frequency and separated laterally in the region of contiguity by a common wall having an aperture, a cathode directly across from said aperture in a portion of the wall of the wave guide opposite said common wall, and means in each of said laterally contiguous portions of the wave guide to accelerate electrons from a plurality of directions toward a region substantially midway between a pair of opposite walls in the respective portion of the wave guide.

4. A continuous length of hollow pipe wave guide folded upon itself to form two laterally contiguous portions spaced an odd number of half wavelengths apart with respect to transmission of waves through the said wave guide at a preassigned operating frequency and separated laterally by a common wall having an aperture, a cathode directly across from said aperture in a portion of the wall of the wave guide opposite said common wall, and means in each of said laterally contiguous portions to accelerate electrons from a plurality of directions toward a region substantially midway between a pair of opposite walls in the respective portion of the wave guide.

5. A continuous length of hollow pipe wave guide having four laterally contiguous portions mounted with their longitudinal axes parallel to each other in the region of contiguity and having three and only three common walls separating one laterally contiguous portion from the next, the inner two laterally contiguous portions being consecutively connected along the length of the guide, and the outer two portions being similarly consecutively connected, a cathode located in the middle one of said three common walls and having active surfaces exposed to the laterally contiguous wave guide portions on either side of said middle wall, said common walls containing a total of two apertures, one in each common wall portion opposite one of the respective active cathode surface, and means in each of said four laterally contiguous portions of the wave guide to accelerate electrons from a plurality of directions toward an equilibrium region located substantially midway between one of said apertures and the opposite wall of the wave guide.

6. A continuous length of hollow pipe wave guide having four laterally contiguous portions mounted parallel to each other and having three and only three common walls separating one laterally contiguous portion from the next, a cathode located in the middle one of said three common walls and having active surfaces exposed to the laterally contiguous wave guide portions on either side of said middle common wall, said common walls containing a total of two apertures, one in each common wall portion opposite one of said respective active cathode surfaces, and means in each of said laterally contiguous portions of the wave guide to accelerate electrons from a plurality of directions toward a region substantially midway between the walls of the wave guide, said electron accelerating means being disposed to operate substantially symmetrically with respect to a plane containing said cathode and said apertures.

7. A continuous hollow pipe type of wave guide having four laterally contiguous portions mounted parallel to each other and having only three common walls separating one laterally contiguous portion from the next, a cathode located in the middle one of said three common walls and having active surfaces exposed to the laterally contiguous wave guide portions on either side of said middle common wall, said common walls containing a total of two apertures, one in each common wall portion opposite one of said active cathode surfaces, a plurality of pairs of anodes, one pair in each of said laterally contiguous wave guide portions, the anodes of each pair being symmetrically disposed with respect to the walls of the wave guide and with respect to a plane passing through a point on the cathode surface and one of said apertures, and means connected to said anodes to maintain the said anodes at a positive potential with respect to the walls of the wave guide.

ARNOLD E. BOWEN.

REFERENCES CITED

The following references are of record in the file of this patent:

UNITED STATES PATENTS

| Number | Name | Date |
| --- | --- | --- |
| 2,153,728 | Southworth | Apr. 11, 1939 |
| 2,368,031 | Llewellyn | Jan. 23, 1945 |